(12) United States Patent
Boonekamp et al.

(10) Patent No.: US 8,292,471 B2
(45) Date of Patent: Oct. 23, 2012

(54) LIGHT SOURCE

(75) Inventors: Erik Boonekamp, Utrecht (NL);
Thomas Duester, Eindhoven (NL)

(73) Assignee: Koninklijke Philips Electronics N.V.,
Eindhoven (NL)

( * ) Notice: Subject to any disclaimer, the term of this patent is extended or adjusted under 35 U.S.C. 154(b) by 0 days.

(21) Appl. No.: 13/143,634

(22) PCT Filed: Nov. 30, 2009

(86) PCT No.: PCT/IB2009/055405
§ 371 (c)(1),
(2), (4) Date: Jul. 7, 2011

(87) PCT Pub. No.: WO2010/079391
PCT Pub. Date: Jul. 15, 2010

(65) Prior Publication Data
US 2011/0267835 A1    Nov. 3, 2011

(30) Foreign Application Priority Data

Jan. 9, 2009    (EP) ..................................... 09150280

(51) Int. Cl.
*F21V 33/00*    (2006.01)
(52) U.S. Cl. .............. 362/311.02; 362/254; 362/249.02; 362/555
(58) Field of Classification Search .................. 362/254, 362/249.02, 311.02, 555, 800
See application file for complete search history.

(56) References Cited

U.S. PATENT DOCUMENTS

| | | | |
|---|---|---|---|
| 3,796,886 A * | 3/1974 | Freeman | 250/493.1 |
| 6,086,218 A * | 7/2000 | Robertson | 362/157 |
| 6,350,041 B1 | 2/2002 | Tarsa et al. | |
| 6,488,392 B1 | 12/2002 | Lu | |
| 6,991,355 B1 | 1/2006 | Coushaine et al. | |
| 7,055,991 B2 * | 6/2006 | Lin | 362/311.02 |
| 7,425,084 B2 * | 9/2008 | Ruud et al. | 362/298 |
| 7,476,002 B2 * | 1/2009 | Wolf et al. | 362/231 |
| 7,726,860 B2 * | 6/2010 | Harrity et al. | 362/555 |
| 2003/0185005 A1 | 10/2003 | Sommers et al. | |
| 2004/0156199 A1 | 8/2004 | Rivas et al. | |
| 2005/0225988 A1 | 10/2005 | Chaves et al. | |
| 2006/0193137 A1 | 8/2006 | Chinniah et al. | |
| 2007/0047232 A1 | 3/2007 | Kim et al. | |

FOREIGN PATENT DOCUMENTS

| | | |
|---|---|---|
| DE | 202008017116 U1 | 4/2009 |
| EP | 1610054 A2 | 12/2005 |
| JP | 2002251907 | 9/2002 |
| JP | 2007088377 | 4/2007 |
| WO | 0140702 A1 | 6/2001 |
| WO | 2009069894 A2 | 6/2009 |

* cited by examiner

*Primary Examiner* — Laura Tso
(74) *Attorney, Agent, or Firm* — Mark L. Beloborodov

(57) ABSTRACT

The present invention relates to a light emitting diode, LED, light source that may be arranged for retrofitting into a luminaire employing an incandescent light source. The light source comprises a light guide into which light from one or more LEDs in a light unit arranged at one end of the light guide is injected, and a reflector having a reflecting surface arranged at the other end of the light guide and facing towards the light guide capable of reflecting light incident on the reflecting surface. According to the present invention, the reflector comprises at least one transmitting portion being arranged such that at least a portion of light incident on the at least one transmitting portion is transmitted through the reflector, for example a through hole extending along an axis, allowing for an almost viewing angle independent light intensity of the light source.

13 Claims, 5 Drawing Sheets

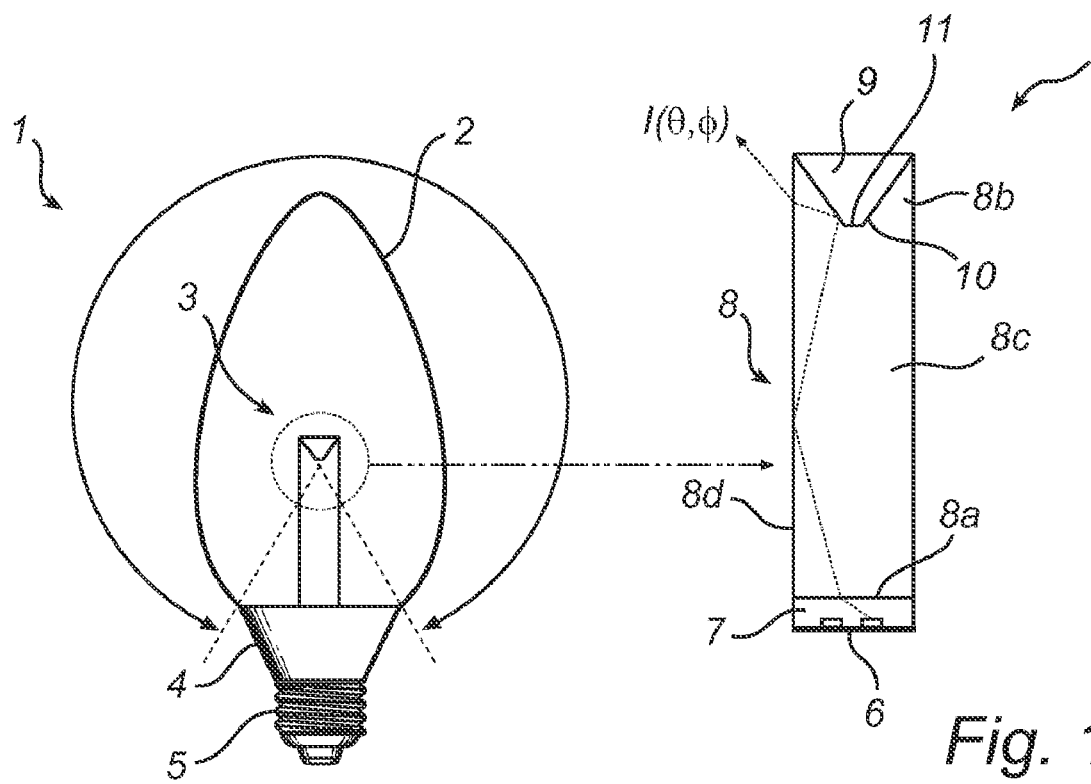
Fig. 1a
Fig. 1b
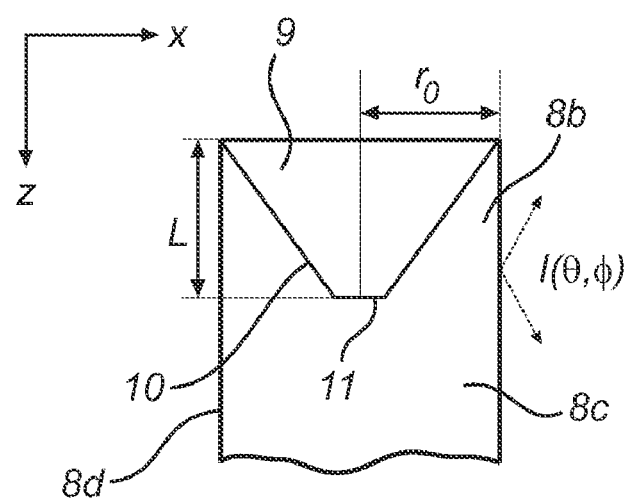
Fig. 2

LIGHT SOURCE

FIELD OF THE INVENTION

The present invention generally relates to the field of lighting design. In particular, the present invention relates to a light emitting diode (LED) light source, which may be arranged for retrofitting in luminaires employing incandescent light sources, such as light bulbs.

BACKGROUND OF THE INVENTION

Conventional incandescent light sources generally convert an electrical current to light by applying a current to a filament, typically made of tungsten, which causes the filament to glow. The filament is generally suspended near the center of a glass bulb, thereby providing radial distribution of light that can be used to illuminate, e.g., a room. Such conventional incandescent light sources are typically used in chandeliers. Due to the high brightness of the glowing filament (~1 Mcd/$m^2$), crystals in the chandelier exhibit decorative sparkling light effects. However, the life span of incandescent light sources is typically relatively short, usually limited to the life span of the filament. In addition, the glass bulb generally becomes very hot due to the high temperature of the filament, presenting a potential danger of burning objects that come into contact with the glass bulb.

Replacing incandescent light sources with LED light sources generally alleviates or eliminates the above problems. In addition, such a replacement provides a significant increase in the efficacy, that is the luminous flux produced by the light source as a ratio to the amount of energy (or power) required to produce it. However, most LEDs are only capable of emitting light into a hemisphere (solid angle $2\pi$ sr), whereas incandescent light sources employing a glowing filament generally emit light uniformly into a full sphere (solid angle $4\pi$ sr).

EP1610054A2 describes a LED lamp assembly for use with automobiles, the LED lamp assembly having a central optical light guide for conducting light emitted by a plurality of LED light sources to a deflector for projection sideways at an angle to the axis of the light guide.

SUMMARY OF THE INVENTION

In view of the above, it is an object of the present invention to provide a light source that alleviates or eliminates the problems as described above.

This and other objectives are completely or partially achieved by a light source in accordance with the independent claim.

According to the present invention, there is provided a light source including a light unit including at least one LED, a reflector arranged such that at least a portion of light incident on the reflector is reflected, and a light transmissive light guide having an input end, an output end, and a central region therebetween, the light guide extending along an axial direction. The light unit is arranged adjacent to the input end for injecting light into the central region of the light guide. The light guide is arranged such that its index of refraction is higher than the index of refraction of the medium exterior to the light guide. Furthermore, the reflector is arranged adjacent to the output end and comprises a reflecting surface facing the output end and covering at least a portion of the output end. The reflector comprises at least one transmitting portion being arranged such that at least a portion of light incident on the at least one transmitting portion is transmitted through the reflector.

According to an embodiment of the present invention, the at least one transmitting portion may comprise a through-going hole extending along an axis. For example, the axis may be a straight axis being coincident or parallel with the axial direction of the light guide.

By these configurations, light in the light guide is thus allowed to leave the light source by either passing through the transmitting portion (or the through hole) or by being reflected at the reflecting surface and subsequently coupled out from the light guide.

Thus, by the configuration of the reflecting surface and/or the transmitting portion (or through hole), light from the light source may have a spatial intensity distribution that is substantially similar to the light intensity distribution of an incandescent light source. Furthermore, by the transmitting portion (or through hole) an almost viewing-angle independent light intensity (i.e. the intensity is substantially independent of the angle at which the light source is viewed by a user) can be achieved. The resulting light intensity distribution is substantially similar to the light intensity distribution of an incandescent light source. In other words, the light source is capable of emitting light substantially uniformly into a full sphere (solid angle $4\pi$ sr). Thus, by the present invention, a large variety of light sources employing LEDs may be manufactured, each in general having different light intensity characteristics according to particular user needs and/or lighting environment requirements.

According to an embodiment of the present invention, the light source is arranged for retrofitting into a luminaire normally employing an incandescent light source. By such a configuration, there is provided a light source that overcomes or alleviates the disadvantages of conventional incandescent light sources, as previously described, as well as provides a significant increase in the efficacy.

In the context of the present invention, the term "retrofitting" means fitting into a light fixture normally used for incandescent light sources, such as a filamented light bulb, a halogen lamp, etc. In other words, by retrofitting the light source according to the present invention into a luminaire normally employing an incandescent light source it is meant replacing the incandescent light source in the luminaire with the light source according to the present invention.

According to another embodiment of the present invention, the reflecting surface is arranged such that at least a portion of the reflecting surface is one of concave and convex. Using one of these configurations, light from the light source may have a spatial intensity distribution that is substantially similar to the light intensity distribution of an incandescent light source. Furthermore, by the particular choice of the concave or convex shape of said at least a portion of the reflecting surface, the light flux from the light source may, for example, be substantially symmetric with respect to a plane perpendicular to the axial direction, or asymmetric, depending on the requirements of the desired lighting application. Thus, in the present embodiment, a large variety of light sources employing LEDs may be manufactured, each light source having light intensity characteristics adapted to particular user needs and/or lighting environment requirements.

In the context of the present invention, by the terms "concave" and "convex" it is meant curving in, or hollowed inward, and curving out, or bulging outward, respectively.

According to another embodiment of the present invention, the light guide comprises a color mixing rod extending along the axial direction, wherein the color mixing rod comprises at least a portion of the central region of the light guide. The color mixing rod is arranged for mixing light from multiple LEDS in the light unit and may have a hexagonal cross section. In this manner, there is provided a LED light source arranged such that light from a number of multiple-color LEDS is well mixed when it reaches the output end of the color mixing rod and thus, well-mixed light can be coupled out from the light guide having an intensity distribution similar to an incandescent light source.

According to yet another embodiment of the present invention, at least one reflecting facet is arranged on the reflecting surface such that at least a portion of light incident on the facet is reflected. Such a reflecting facet can be used to create substantial light intensity variations as a function of the viewing angle of the user. Thus, by such a configuration, a LED light source can be provided that exhibits strong viewing-angle dependent sparkling light effects (i.e. having a light intensity that varies considerably depending on the viewing angle).

According to yet another embodiment of the present invention, the reflecting surface comprises one or more of the following: a metal coating, such as an aluminum coating, an interference filter, such as a multilayer of thin $SiO_2$ and $ZrO_2$ layers, a diffuse coating, and a phosphor coating. The interference filter may be arranged such that it deliberately transmits a small portion of light incident thereon. By the diffuse coatings, the brightness of the light source can be considerably reduced, which can be desirable in some applications for improving visual comfort. By applying a metal coating, such as aluminum, there is achieved a relatively inexpensive, yet highly reflecting, surface.

According to yet another embodiment of the present invention, the light source further includes at least one translucent envelope at least partly surrounding the reflector. By such a configuration, the optical performance (that is, the light intensity distribution) or visual comfort (for example, reduction of brightness) can be improved. The at least one translucent envelope may comprise light scattering elements. In this manner, the brightness of the light source can be decreased and/or the light intensity distribution of the light source can be smoothened.

It will be appreciated that such a translucent envelope can also be used to provide a decorative enhancement in that it can be arranged so that it hides other optical elements of the light source from the view of the user. For example, by a suitable surface treatment, the translucent envelope can be arranged such that it exhibits a frosted appearance, or, optionally or alternatively, the translucent envelope can be arranged such that it is slightly colored by pigments dispersed in the material of which the translucent envelope is made.

According to yet another embodiment of the present invention, the light source further includes a base onto which the light unit is arranged, which base includes an electrical connector arranged to mate with a socket connector of a luminaire or light fixture. The base further includes electrical circuitry connected to the electrical connector, which electrical circuitry is arranged to receive electrical power from the electrical connector and, by means of the electrical power, operate the light unit. In this manner, an easy fitting of the light source into a light fixture or luminaire normally employing an incandescent light source is achieved. The light source may further include a heatsink device arranged in the base, which heatsink device is adapted to dissipate heat generated by the light unit. Thus, the surfaces of the light source can be kept relatively cool to avoid burns to a user caused by contact with the light source. Furthermore, the life span of the light source can be increased due to less thermal stress and/or strain in the light source components.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, unit, means, step, etc]" are to be interpreted openly as referring to at least one instance of said element, device, component, unit, means, step, etc., unless explicitly stated otherwise.

It is noted that the present invention relates to all possible combinations of features recited in the claims.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals are used for identical or similar elements, wherein:

FIG. 1a is a schematic view of an exemplary embodiment of the present invention;

FIG. 1b is a schematic view of a portion of the exemplary embodiment of the present invention shown in FIG. 1a;

FIG. 2 is a portion of the view shown in FIG. 1b;

DETAILED DESCRIPTION OF THE EMBODIMENTS

Figure 3:
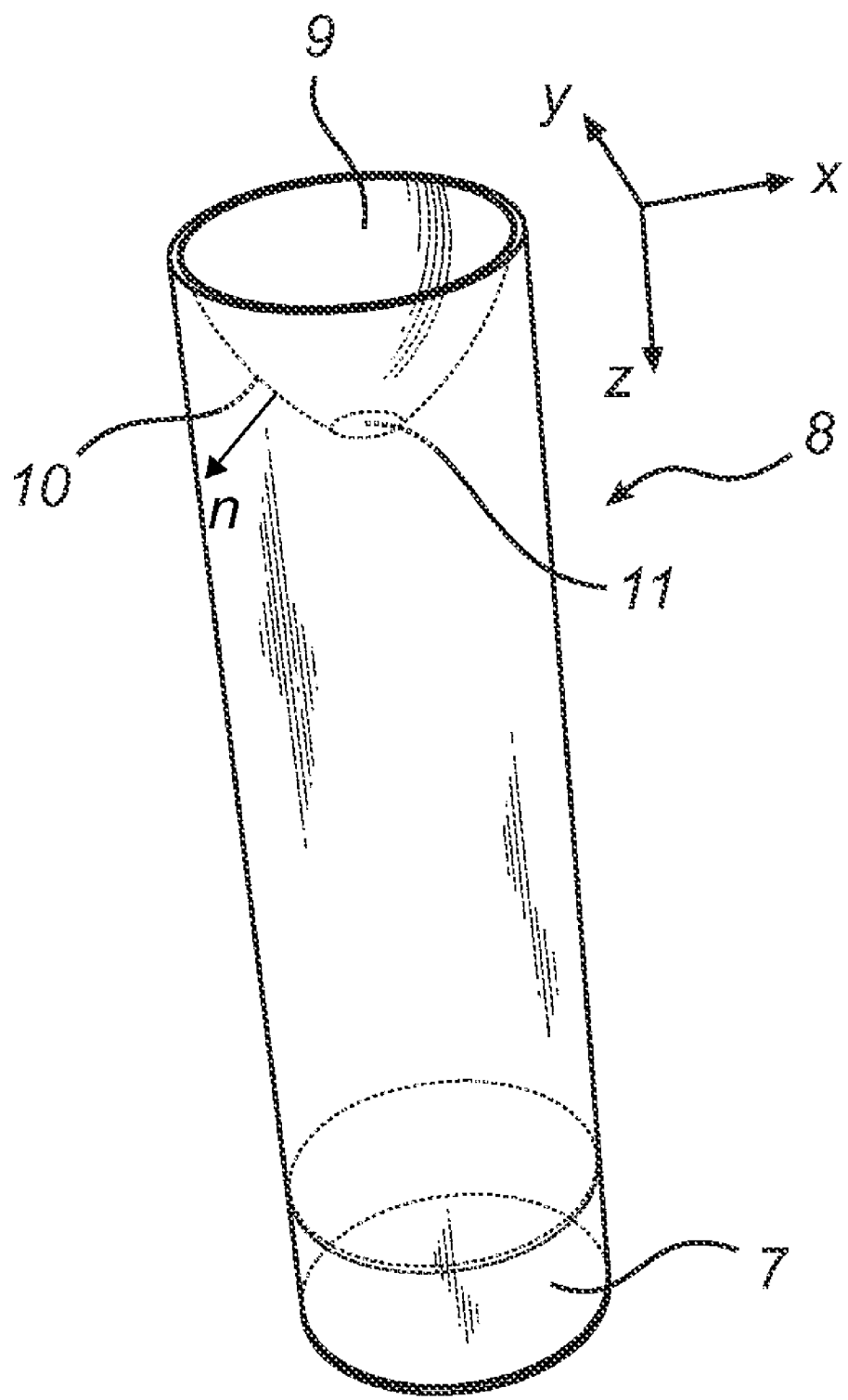
FIG. 3 is a schematic view of yet another exemplary embodiment of the present invention.

Different exemplary embodiments of the present invention will now be described mainly with respect to a light source being arranged for retrofitting into a luminaire normally employing an incandescent light source. However, it is to be understood that the light source is not limited to the exemplary case of retrofitting applications, but may rather be a light source used in a variety of applications.

FIG. 1a is a schematic sectional view of a light source 1 illustrating an exemplary embodiment of the present invention, the light source 1 being arranged for retrofitting into a luminaire (not shown) normally employing an incandescent light source, such as a filamented light bulb. Such a luminaire may also be a halogen lamp or the like. It is to be understood that in the context of the present invention, by the term "retrofitting" it is meant fitting into a light fixture normally used for incandescent light sources (that is, replacing an incandescent light source normally used in the luminaire with a light source according to the present invention).

As illustrated in FIG. 1a, the light source 1 may comprise a clear glass envelope or envelope 2, inside which a so-called remote emitter 3 is located that is capable of emitting light having a spatial intensity distribution similar to an incandescent light source, such as a glowing filament, as will be further described in the following description. Furthermore, by the term "remote emitter" it is meant a light emitting device comprising one or more LEDs, a light guide, and a reflector. The light emitting region of the one or more LEDs is substantially shifted or replaced to an end of the light guide at which the reflector is arranged. The light source 1 may further comprise a base 4 onto which the remote emitter 3 is arranged or to which remote emitter 3 is coupled to. The base 4 may comprise an electrical connector 5, preferably threaded, which is arranged such that it is capable of mating with a socket connector (not shown), preferably threaded, of a luminaire (not shown) employing an incandescent light source, such as a filamented light bulb.

FIG. 1*b* is a schematic sectional side view of the remote emitter 3 described with reference to FIG. 1*a*, illustrating the idea of the present invention by means of a non-limiting exemplary embodiment. As shown in FIG. 1*b*, the remote emitter 3 comprises a light unit 6 comprising at least one LED, in this exemplary case comprising two LEDs, arranged in a cavity 7 preferably having specularly reflecting walls. According to one example, the cavity has a cylindrical shape, although it is to be understood that the shape of the cavity is not limited to this choice. It is to be understood that the present invention encompasses embodiments having light units 6 comprising any number of LEDs. For example, the light unit 6 may comprise a single large-sized LED, such as an Acriche LED from Seoul Semiconductors, or a LED array, such as a LUXEON Rebel from Philips Lumileds.

The remote emitter 3 further comprises a light transmissive light guide 8 having an input end 8*a*, an output end 8*b*, and a central region 8*c* therebetween. As illustrated in FIG. 1*b*, the light unit 6 is arranged adjacent to the input end 8*a* for injecting light into the central region 8*c*. As further illustrated in FIG. 1*b*, the light guide 8 may be configured such that it generally extends along an axial direction.

It is also contemplated that the light guide 8 may be slightly tapered towards the input end 8*a*, i.e. the dimensions of the light guide 8 in a plane defined by the axial direction and a transversal direction perpendicular to the axial direction may become progressively larger along the axial direction towards the output end 8*b*. In the exemplary case of the light guide 8 having a cylindrical shape, this would mean that the diameter of the light guide 8 becomes progressively larger with the distance along the axial direction towards the output end 8*b*.

The remote emitter 3 further comprises a reflector 9 arranged adjacent to the output end 8*b*, the reflector 9 being configured such that at least a portion of light that is incident on the reflector 9 is reflected. The fraction of light reflected from the reflector 9 depends on the reflectivity of the reflector 9. The reflector 9 is further arranged so that it has a reflecting surface 10 that faces the output end 8*b* and covers at least a portion of the output end 8*b*. For example, between 80% and 90% of the surface of the output end 8*b* may be covered by the reflecting surface 10. Alternatively, the reflecting surface 10 may completely cover the surface of the output end 8*b*. The reflecting surface 10 may, for example, comprise one or more of the following: a metal coating, such as highly reflective aluminum, a high-reflectance interference filter, such as a multilayer of thin $SiO_2$ and $ZrO_2$ layers, a white diffuse coating, and a phosphor coating. The interference filter or coating may be arranged such that it deliberately transmits a small portion of light incident thereon. For example, the interference coating may be designed to transmit about 4% of the light incident on it and (specularly) reflect the remainder of the light incident on it. By the diffuse coatings, the brightness of the light source 1 can be considerably reduced, which can be desirable in some applications for improving visual comfort. Such diffuse coatings may also be made transflective.

The light guide 8 may have a cylindrical shape, although the present invention is not limited to this particular case. On the contrary, any geometric shape of the light guide 8 suitable for achieving the functions and capabilities of the light source 1 is contemplated to be within the scope of the present invention. The light guide 8 may be made of a substance selected from the group of transparent polymers, polymer compounds, glass, polycarbonate, polymethylmethacrylate, acrylic, other types of plastics, and combinations thereof. Also, as further illustrated in FIG. 1*b*, the reflector 9 further comprises a transmitting portion 11 being arranged such that at least a portion of light incident on the transmitting portion 11 is transmitted through the reflector 9, such that light from the light guide 8 may leave the light source 1 either by passing through the transmitting portion 11 or by being reflected at the reflecting surface 10 and subsequently coupled out from the light guide 8. By this configuration, an almost viewing-angle independent light intensity can be achieved. For example, the transmitting portion 11 may be a portion of the reflector 9 that is not covered with a reflective material. The transmitting portion 11 may also comprise a through hole 11 extending along the axial direction (the z-axis). It is to be understood that such a through hole 11 may also extend along an axis that is at an angle to the axial direction. The axis along which the through hole 11 extends is preferably straight, although through holes that are curved to some degree may also be contemplated.

The operation of the remote emitter 3 is as follows.

Light emitted from the LEDs in the light unit 6 is injected (transmitted) into the central region 8*c* of the light guide 8. There is generally no need to collimate the light before it enters the light guide 8. It is to be understood that a small portion of the light from the LEDs is reflected at the light guide boundary at the input end 8*a*, typically about 4%, with the rest of the light being injected into the central region 8*c* of the light guide 8. The light in the light guide 8 is then generally transported along the extension of the light guide 8 towards the output end 8*b*.

The light guide 8 is preferably configured such that the index of refraction of the light guide 8 is higher than the index of refraction of the medium exterior to the light guide 8, which exterior medium typically is air having an index of refraction of about 1. In other words, the light guide 8 is preferably arranged such that it has a higher optical density (index of refraction) than the medium exterior to the light guide 8. Typically, the light guide 8 is arranged such that it has an index of refraction of about 1.5 or higher, although it is not limited to this specific example. The transportation of light in the light guide 8 is based on total internal reflection. Light travelling in the light guide 8 generally does not exit the light guide 8 when it reaches the boundary between the light guide 8 and the medium exterior to the light guide 8, which medium is less optically dense than the light guide 8, but is reflected back into the light guide 8. On one hand, when the angle of incidence of the light incident on said boundary 8*d* is larger than the critical angle (that is, the angle of incidence at which light is refracted so that it travels along the boundary surface 8*d*), the light is reflected back without loss. On the other hand, for increasingly lower angles of incidence, an increasingly larger fraction of the incident light will be transmitted through the boundary surface 8*d* out from the light guide 8.

In the context of the present invention, by the term "interior boundary surface" it is meant the surface of the interface between the light guide 8 and the immediate surroundings of the remote emitter 3, which surface has a normal facing inwards in the light guide 8.

In the context of the present invention, by the term "angle of incidence" it is meant the angle between a ray of light incident on a surface and the normal of the surface at the point of incidence, unless otherwise specified.

When light from the light unit 6 thus transported in the light guide 8 hits the reflecting surface 10 of the reflector 9, a fraction of the light is reflected depending on the reflectivity of the reflecting surface 10. For example, the reflecting surface 10 may be arranged such that it has a reflection coefficient close to 1 or substantially 1. By the shape of the reflecting surface 10, most of the light reflected from the reflecting surface 10 is refracted at the interface between the light guide 8 and the medium exterior to the light guide 8, namely the interior boundary surface 8d, and subsequently leaves the light guide 8. By the particular shape of the reflecting surface 10, the intensity of the light that leaves the light guide 8 after having been reflected at the reflecting surface 10 is substantially similar to the light intensity of an incandescent light source.

FIG. 2 is a schematic sectional side view of an exemplary embodiment according to the present invention showing a portion of the light guide 8 and the reflector 9, wherein an exemplary shape of the reflecting surface 10 is indicated. The embodiment of the present invention illustrated in FIG. 2, comprising a light guide 8 in the form of a cylindrical rod, is conveniently described using the coordinates (x, z) indicated in FIG. 2, wherein $r_o$ is the radius of the base of the cylindrical rod along the x-axis, and L is the length of the extension of the reflector along the z-axis. In this exemplary case, the z-axis coincides with the axial direction along which the light guide 8 extends.

Figure 4A:
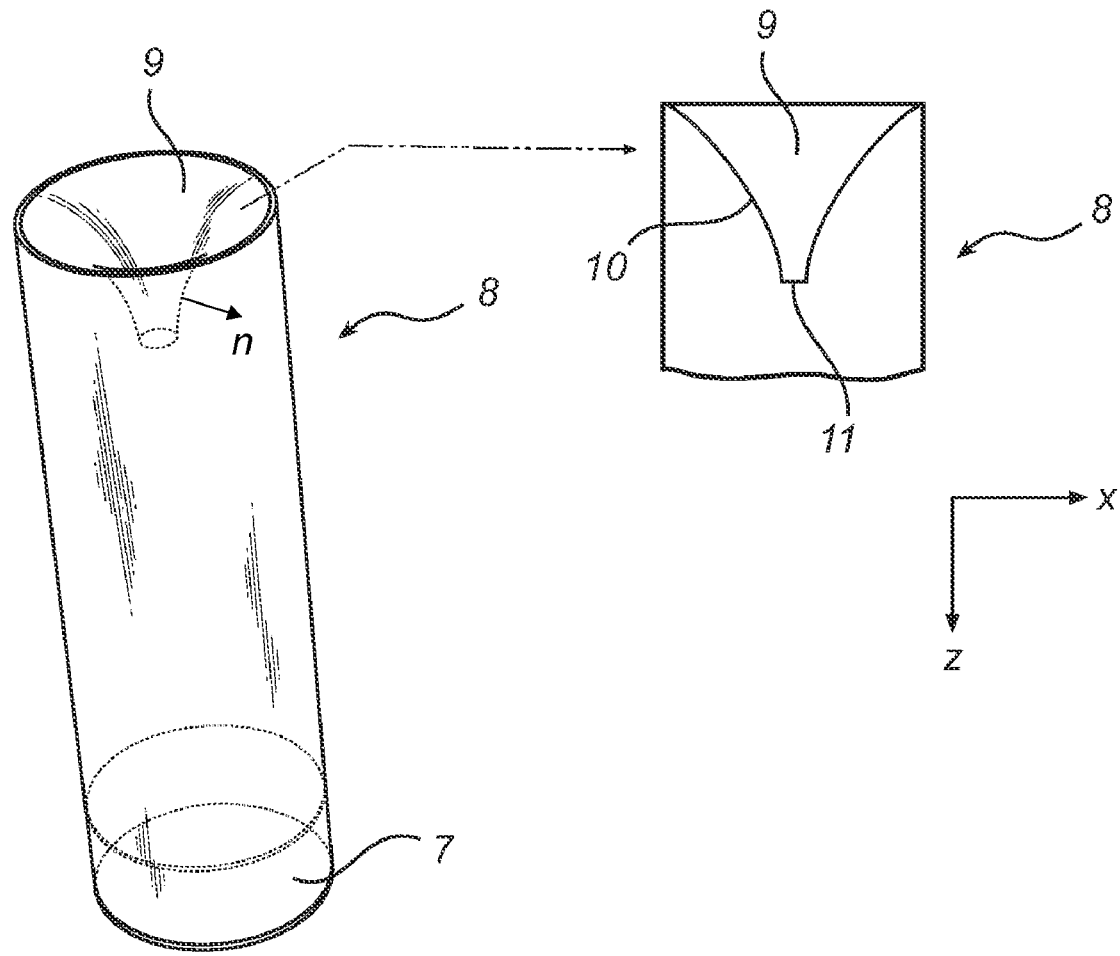
FIG. 4a are schematic views of yet another exemplary embodiment of the present invention.

FIGS. 3 and 4a illustrate two exemplary embodiments of the present invention.

According to the embodiment illustrated in FIG. 3, the reflector 9 has a reflective surface 10 facing the output end of the light guide 8. The reflecting surface 10 thereby has a normal n directed towards the output end of the light guide 8, as illustrated in FIGS. 3 and 4a. According to the example illustrated in FIG. 3, the reflective surface 10 is arranged such that at least a portion of the reflective surface 10 is convex, that is bulging outwards (towards the interior boundary surface of the light guide 8).

According to the embodiment illustrated in FIG. 4a, the reflective surface 10 is arranged such that at least a portion of the reflective surface 10 is concave, that is bulging inwards (away from the interior boundary surface of the light guide 8).

By the configurations illustrated in FIGS. 3 and 4a, light emitted from the light source may have a spatial intensity distribution that is substantially similar to the light intensity distribution of an incandescent light source. By the particular choice of the concave or convex shape of said at least a portion of the reflecting surface, the light flux from the light source can, for example, be substantially symmetric with respect to a plane perpendicular to the axial direction, or asymmetric, depending on the requirements of the desired lighting application. This makes the light source according to the illustrated embodiments very versatile. In other words, a large variety of LED light sources may be manufactured, each light source having light intensity characteristics adapted to particular user needs and/or lighting environment requirements.

Figure 4B:
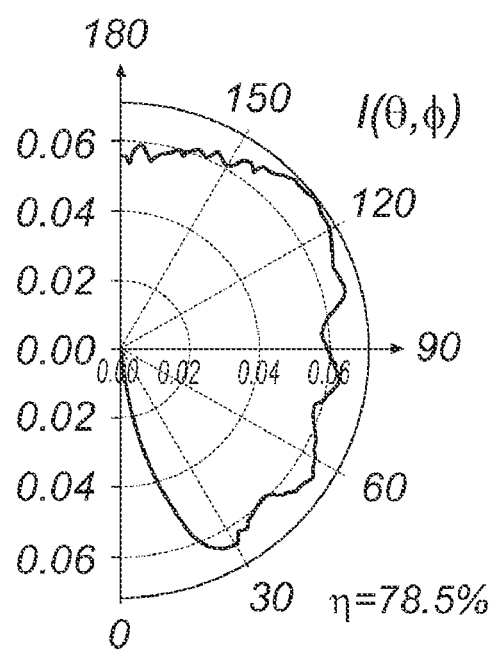
FIG. 4b is an exemplary light intensity profile of the far-field angular light intensity distribution of light emitted from a light source according to an exemplary embodiment.

FIG. 4b shows the light intensity profile of the far-field angular light intensity distribution $I(\theta, \phi)$ of light leaving the light guide 8 associated with the embodiment described with reference to FIG. 4a, wherein $\theta$ is the polar angle from the z-axis axis and $\phi$ is the azimuthal coordinate in the xy-plane from the x-axis. The full three-dimensional intensity is a surface of revolution around the z-axis. The light intensity profile shown in FIG. 4b has been produced by modeling the light source described with reference to FIG. 4a using the illumination application software product LightTools® version 6.1.0.

Figure 5:
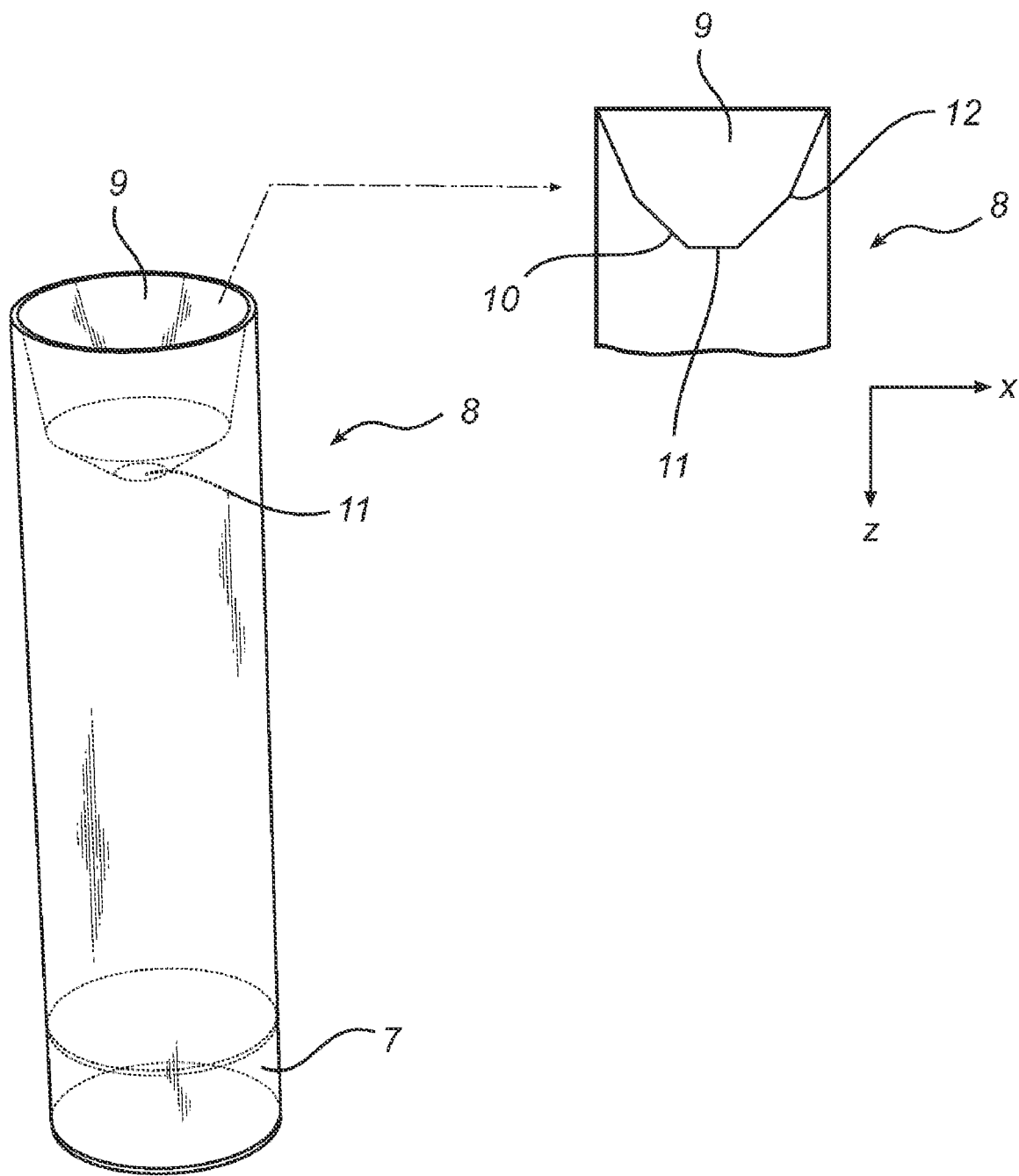
FIG. 5 is a schematic view of yet another exemplary embodiment of the present invention.

FIG. 5 illustrates yet another exemplary embodiment of the present invention, wherein the reflecting surface 10 has been provided with a reflecting facet 12 arranged such that at least a portion of the light incident on the facet 12 is reflected. Any of the light sources described in the foregoing and in the following embodiments may comprise such a reflecting facet 12. Furthermore, it is to be understood that other embodiments describing light sources comprising any suitable number of facets also are within the scope of the present invention. Such a facet 12 can be used to create substantial light intensity variations as a function of the viewing angle of the user. By such a configuration, thus capable of creating substantial spatial light intensity variations, a light source can be designed with enhanced viewing-angle dependent sparkling effects in a luminaire (for example, a chandelier).

Figure 6:
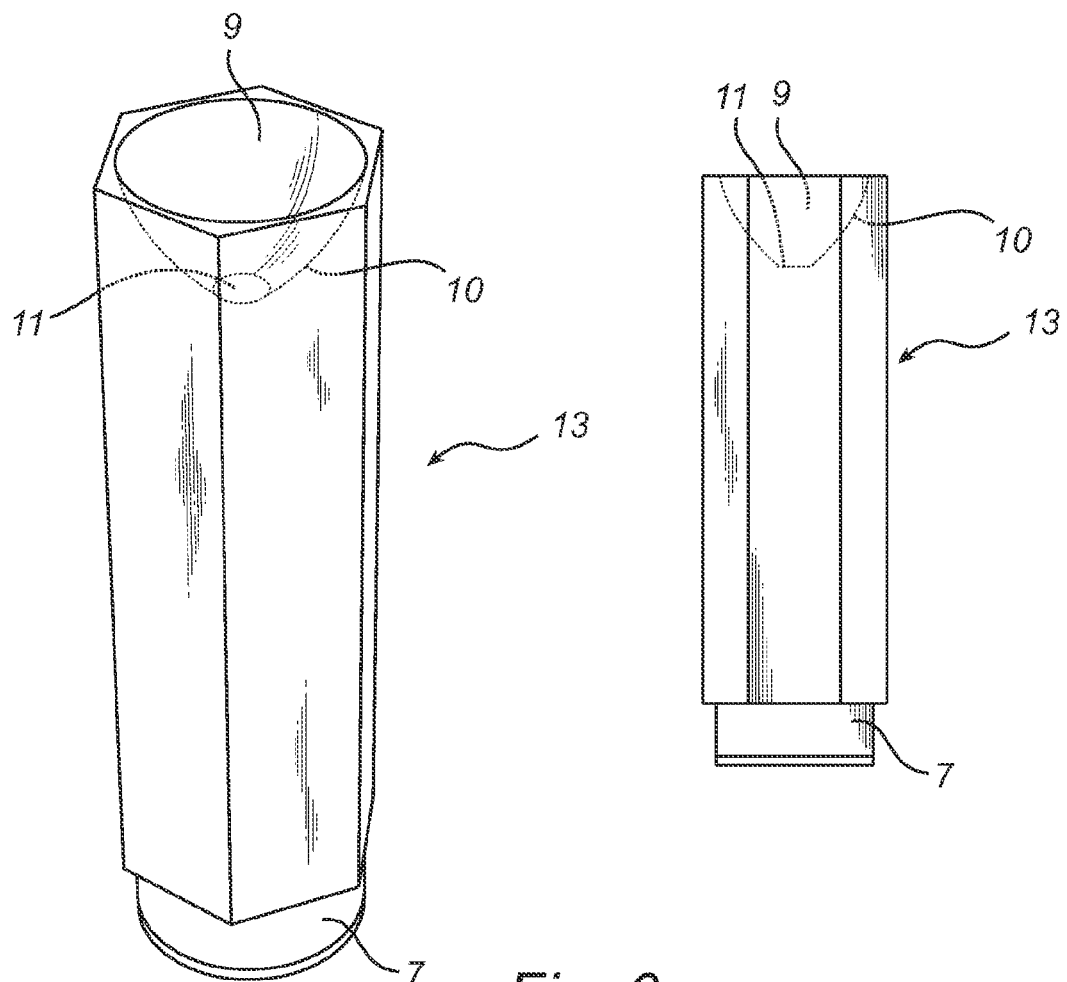
FIG. 6 are schematic views of yet another exemplary embodiment of the present invention.

FIG. 6 illustrates yet another exemplary embodiment of the present invention, wherein the light guide comprises a color mixing rod 13 extending along the axial direction (in the illustrated embodiment along the z-axis), for mixing light from multiple light sources (LEDs) in the light unit included in the cavity 7 emitting light in general having different colors from each other (e.g. a cool white LED and an amber LED). According to the exemplary embodiment illustrated in FIG. 7, the color mixing rod 13 has a hexagonal cross section when viewed in the xy-plane. It is also envisaged that the color mixing rod 16 may have a square cross section when viewed in a plane perpendicular to the axial direction (e.g., the xy-plane). Both of these so-called hexagonal and square color mixing rods are very effective for mixing light of various colors. Preferably, the magnitude of the extension of the color mixing rod 13 along the axial direction is such that light from the multiple-color sources is well mixed when it reaches the output end of the color mixing rod 13, such that well-mixed light can be coupled out from the light guide after having been reflected from the reflector 9. It is to be understood that any one of the previously described embodiments and the embodiments described in the following can be combined with such a hexagonal color mixing rod 13.

Figure 7:
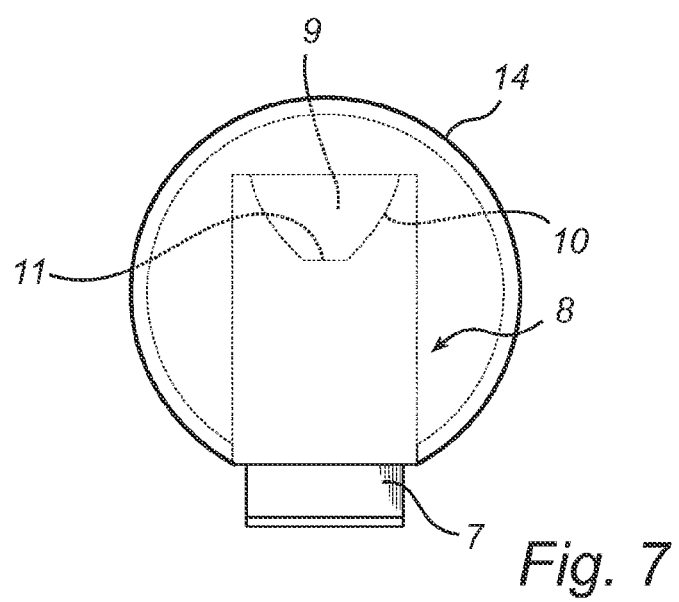
FIG. 7 is a schematic view of yet another exemplary embodiment of the present invention.

FIG. 7 illustrates yet another exemplary embodiment of the present invention, wherein any of the light sources described in the foregoing embodiments can be combined with one or more translucent envelopes 14 at least partly surrounding the reflector 9. For example, the translucent envelope 14 may comprise a hollow sphere, such as illustrated in FIG. 7. Alternatively or optionally, the light source 1 may comprise a clear glass envelope or bulb, inside which a remote emitter is arranged, such as illustrated in FIG. 1a. A hollow sphere, such as illustrated in FIG. 7, as well as any other translucent envelope 14, can conveniently be used to improve the optical performance (that is, the light intensity distribution) or visual comfort (for example, reduce the brightness). Optionally, the translucent envelope 14 can be provided with light scattering elements in order to, e.g., decrease the brightness and smoothen the light intensity distribution. The translucent envelope 14 can also be used to provide a decorative enhancement in that it can be arranged so that it hides other optical elements from being viewed by the user. For example, by a suitable surface treatment, the translucent envelope 14 can be arranged such that it exhibits a frosted appearance, or, optionally or alternatively, the translucent envelope 14 can be arranged such that it is slightly colored by pigments dispersed in the material of which the translucent envelope 14 is made, for example a clear polymer.

The embodiments described above may be arranged such that, apart from the respective advantages associated therewith, each embodiment may enable a large optical efficiency (that is, the ratio of the luminous flux outputted from the light source and the initial amount of the installed luminous flux). For example, under the assumption that each reflecting surface 10 has a reflection coefficient of 1, and that the surface on which each light unit is arranged has reflection coefficient of 0, the resulting optical efficiency η for the embodiment depicted in FIG. 4a becomes as indicated in FIG. 4b. Under these assumptions, substantially all optical losses are related to the optical losses at the input end 8a of the light guide 8.

In conclusion, the present invention is related to a LED light source that may be arranged for retrofitting into a luminaire employing an incandescent light source. The light source comprises a light guide, into which light from one or more LEDs in a light unit arranged at one end of the light guide is injected, and a reflector having a reflecting surface arranged at the other end of the light guide and facing towards the light guide capable of reflecting light incident on the reflecting surface. According to the present invention, the reflector comprises at least one transmitting portion being arranged such that at least a portion of light incident on the at least one transmitting portion is transmitted through the reflector, for example a through hole extending along an axis, allowing for an almost viewing angle independent light intensity of the light source.

The present invention has mainly been described above with reference to a few embodiments. However, as is readily appreciated by a person skilled in the art, other embodiments than the ones disclosed above are equally possible within the scope of the present invention, as defined by the appended claims.

The invention claimed is:

1. A light source comprising:
a light unit including at least one light emitting diode (LED);
a reflector being arranged such that at least a portion of light incident on the reflector is reflected; and
a light transmissive light guide having an input end, an output end, and a central region therebetween, the light guide extending along an axial direction;
wherein:
the light unit is arranged adjacent to the input end for injecting light into the central region;
an index of refraction of the light guide is higher than the index of refraction of a medium exterior to the light guide;
the reflector is arranged adjacent to the output end and comprises a reflecting surface facing the output end and covering at least a portion of the output end; and
wherein:
the reflector comprises at least one transmitting portion being arranged such that at least a portion of light incident on the at least one transmitting portion is transmitted through the reflector.

2. The light source according to claim 1, wherein the light source is arranged for retrofitting into a luminaire employing an incandescent light source.

3. The light source according to claim 1, wherein the at least one transmitting portion defines a through hole extending along an axis.

4. The light source according to claim 3, wherein the axis is a straight axis being parallel with the axial direction.

5. The light source according to claim 1, wherein the reflecting surface is arranged such that at least a portion of the reflecting surface is one of concave and convex.

6. The light source according to claim 1, wherein the light guide comprises a color mixing rod extending along the axial direction, wherein the color mixing rod comprises at least a portion of the central region, the color mixing rod having a hexagonal cross section and being arranged for mixing light from multiple LEDs of the light unit.

7. The light source according to claim 1, wherein at least one reflecting facet is arranged on the reflecting surface such that at least a portion of light incident on the facet is reflected.

8. The light source according to claim 1, wherein the reflecting surface comprises one or more of the following:
a metal coating;
an interference filter;
a diffuse coating; and
a phosphor coating.

9. The light source according to claim 1, further comprising at least one translucent envelope at least partly surrounding the reflector.

10. The light source according to claim 9, wherein the at least one translucent envelope comprises light scattering elements.

11. The light source according to claim 1, wherein the light guide comprises a substance selected from the group consisting of transparent polymers, polymer compounds, glass, polycarbonate, polymethylmethacrylate, acrylic, plastic, and combinations thereof.

12. The light source according to claim 1, further comprising a base onto which the light unit is arranged, the base including an electrical connector arranged to mate with a socket connector of the luminaire, the base further including electrical circuitry connected to the electrical connector, the electrical circuitry being arranged to receive electrical power from the electrical connector and, by means of the electrical power, operate the light unit.

13. The light source according to claim 12, wherein the base further includes a heatsink device adapted to dissipate heat generated by the light unit.

* * * * *